United States Patent [19]

Giles

[11] 4,193,339

[45] Mar. 18, 1980

[54] MOTOR VEHICLE VENTILATION DEVICE

[76] Inventor: William E. Giles, 9782 Central, Garden Grove, Calif. 92644

[21] Appl. No.: 910,235

[22] Filed: May 30, 1978

[51] Int. Cl.² ............................................. B60H 1/26
[52] U.S. Cl. ................... 98/2.14; 98/42 R; 49/98
[58] Field of Search ........... 98/2, 2.14, 2.15, 20, 98/42 R, 78, 13, 37, 8, 9; 296/137 F, 21, 37 F; 49/98

[56] References Cited

U.S. PATENT DOCUMENTS

| | | | |
|---|---|---|---|
| 1,389,788 | 9/1921 | Steger | 98/20 |
| 2,084,787 | 6/1937 | Zaustinsky | 98/13 |
| 2,458,324 | 1/1949 | Volkman et al. | 98/20 |
| 2,987,980 | 6/1961 | Winn | 98/2.15 |
| 3,401,620 | 9/1968 | Armstrong et al. | 98/2.14 |
| 3,843,195 | 10/1974 | Lindington | 296/137 J |
| 3,919,927 | 11/1975 | Bernard, Jr. | 98/37 |
| 4,038,911 | 8/1977 | Hart | 98/2.14 |

FOREIGN PATENT DOCUMENTS 1088528  9/1960  Fed. Rep. of Germany .............. 98/9

*Primary Examiner*—Henry C. Yuen
*Attorney, Agent, or Firm*—Knobbe, Martens, Olson, Hubbard & Bear

[57] ABSTRACT

A combination air vent and air scoop for the roof top of a motor vehicle has an integral body with an air inlet scoop in the front and an air outlet vent in the rear. The scoop is opened and closed by means of a panel which has a closed position in which it rests flush against the body of the device and an open position in which it extends inwardly into the interior of the device. The vent is opened and closed by means of a second panel which likewise has a closed position in which it rests flush against the body of the device and an open position in which it extends into the interior of the device. Means are provided for actuating the scoop panel and the vent panel independently. Both the scoop and the vent can be opened and closed while maintaining the body of the device in a fixed relationship with the roof of the motor vehicle.

12 Claims, 5 Drawing Figures

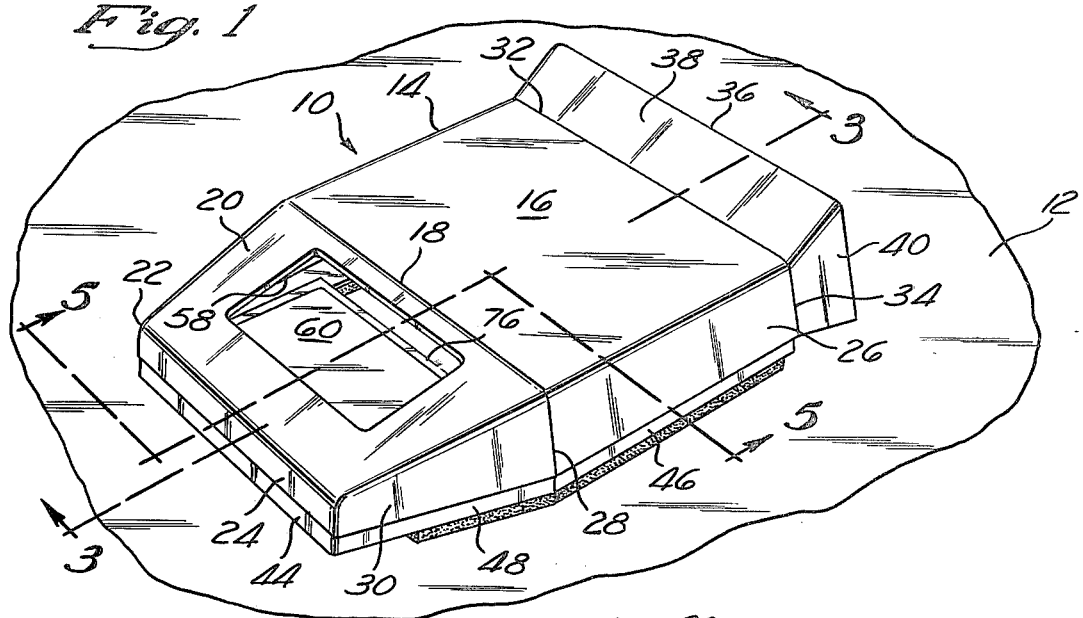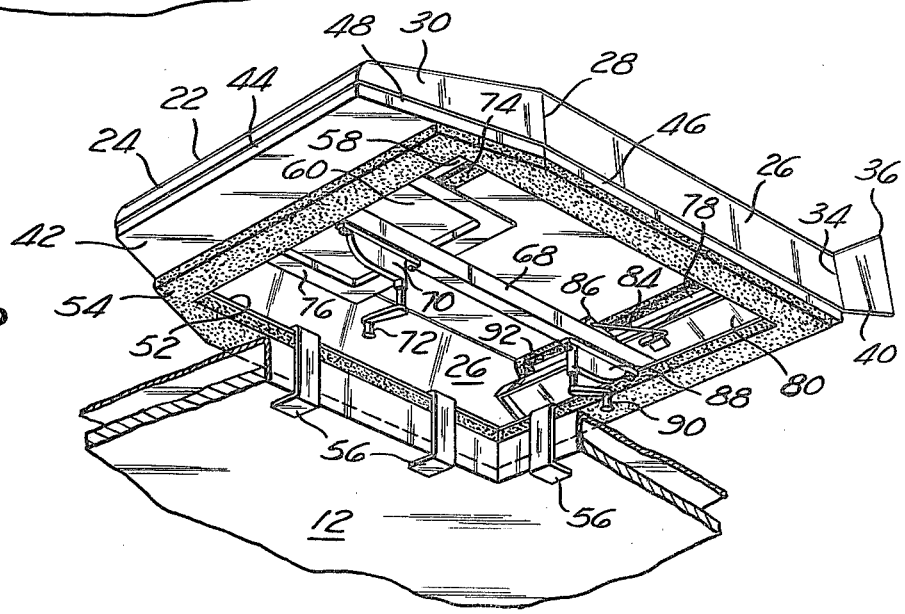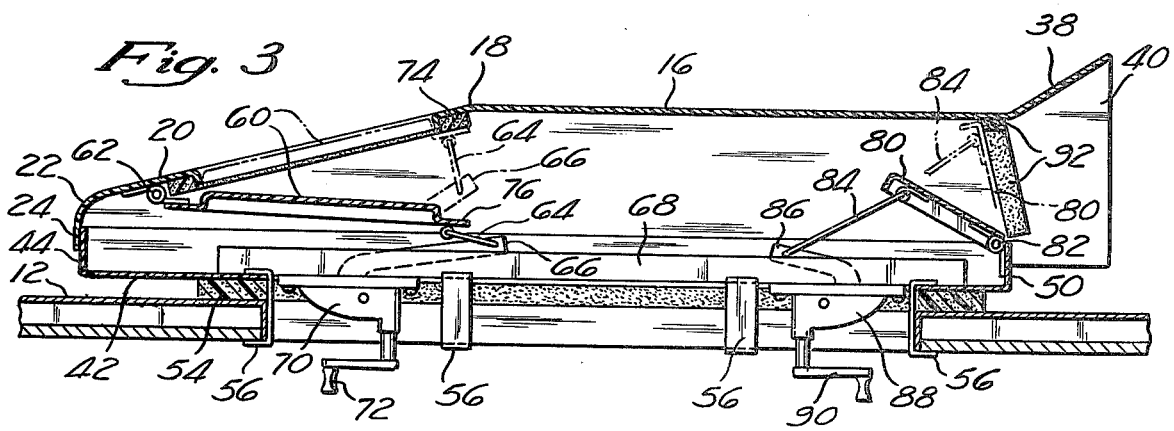

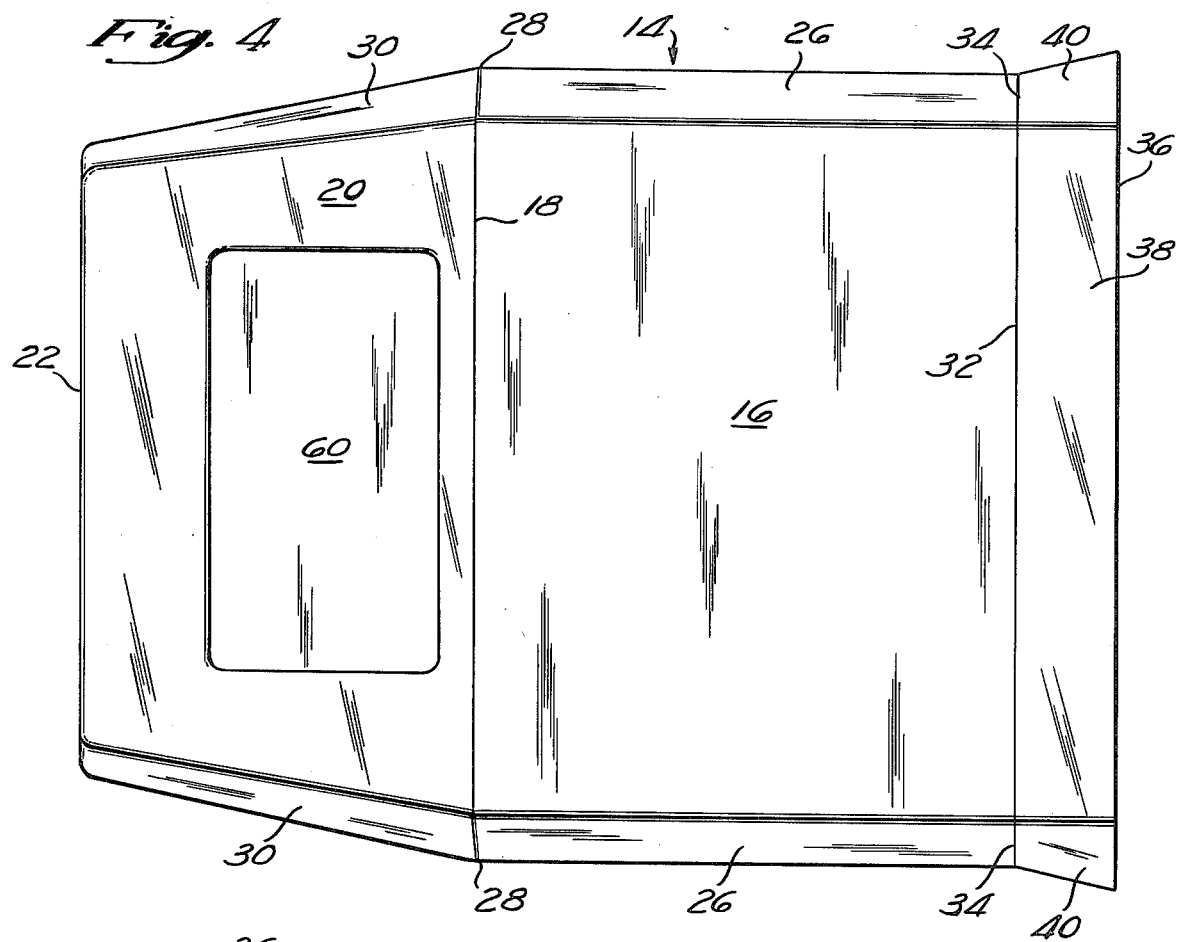
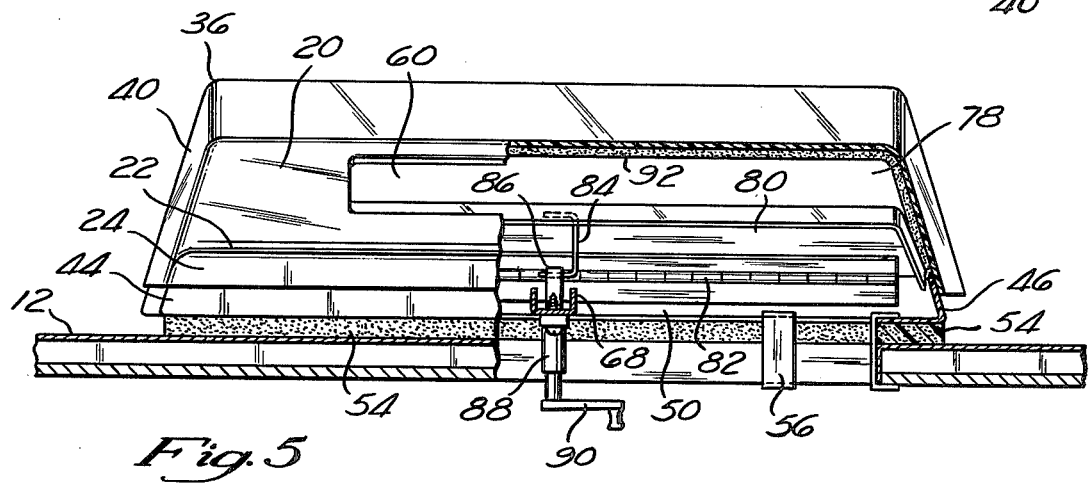

MOTOR VEHICLE VENTILATION DEVICE

BACKGROUND OF THE INVENTION

The present invention relates to ventilation devices in motor vehicles, especially such vehicles as vans and campers. In particular, the invention relates to a combination of air scoop and air vent for the roof top of a motor vehicle.

With the increasing popularity of recreational motor vehicles such as vans and campers, various means have been devised to provide fresh air ventilation through the body of the vehicle. Such devices are usually mounted on the roof of the vehicle and direct air into and out of the vehicle through a hole in the roof. Among such devices are those known as air scoops which direct air into the vehicle, the air then being exhausted through the windows of the vehicle, and air vents which direct air which has been drawn into the vehicle through the windows out of the vehicle. Increasingly popular are those devices which can function both as scoops and vents. One of the most popular of such combination devices is simply a lid which is liftable vertically upward from a frame around a hole in the roof of the vehicle. However, the liftable lid type device is prone to several shortcomings. Firstly, any scooping effect of air into the body of the vehicle is relatively weak inasmuch as air flows directly through the device creating a venturi-type action which sucks air out of the vehicle. Furthermore, the lifting lid type device allows rain to enter the vehicle during the venting operation. Moreover, such devices are prone to damage if they are opened when the vehicle is traveling at a high speed or when there is a strong wind. In short, such devices are unsuitable for use in inclement weather and function weakly, if at all, as scoops. If any case such devices cannot be made to function only as scoops.

Another combination scoop/vent device is that which consists of a lid which can be lifted from a frame surrounding the hole in the roof in one of three ways: lifted at the front, it functions as a scoop; lifted at the rear, it functions as a vent; and lifted straight up, it functions as a venturi vent much as the lifting top type device. While this latter type device can function independently as a vent or a scoop, the fact that the top of the device must be lifted from the roof of the vehicle again makes such devices prone to damage in strong winds or during high-speed travel.

SUMMARY OF THE INVENTION

The invention comprises a relatively low profile closed body or shell having integral top, side, front and rear portions. The body or shell is attached to the roof of the vehicle around the perimeter of a hole cut in the roof. The front of the body has a downwardly sloped portion forming an aerodynamic wedge. This downwardly sloping portion has an opening through which air may flow into the device and into the vehicle through the hole in the roof, thus allowing the device to function as an air scoop. This air inlet opening is closable by a movable panel which has a closed position in which it rests flush against the perimeter of the opening and an open position in which it extends inwardly into the interior of the device.

Therear portion of the body is provided with an air outlet opening through which air may flow from the interior of the vehicle to the exterior. Like the air inlet opening, the air outlet opening is closable by a movable panel which has a closed position in which it rests flush against the portions of the body surrounding the outlet opening and an open position in which it extends into the interior of the body.

Each of the panels which respectively open and close the air inlet and air outlet is actuated by a separate cranking mechanism thus allowing the independent adjustment of the air inlet and the air outlet to any desired position between fully open and fully closed. With the air inlet open and the air outlet closed, the device functions as a scoop. With the air inlet closed and the air outlet opened, the device functions as a vent. With both the air outlet and the air inlet opened a venturi effect is created which allows venting along with some degree of scooping.

With the structure described above, all three modes of operation can be accomplished without the lifting of any part of the device out of the low stream-lined profile of the body so that no part of the structure is ever presented to a position where it can be caught by onrushing air. Thus, the potential for damage due to wind or high-speed driving is essentially eliminated. Furthermore, the pleasing lines of the device are never destroyed as is the case with those devices which utilize liftable lids or hatches.

The invention also incorporates an integral spoiler at the rear of the body which creates a partial vacuum at the outlet opening thereby contributing to the venting action. The spoiler overhangs the vent, thereby allowing the vent to be opened without fear of rain entering the vehicle.

BRIEF DESCRIPTION OF THE DRAWINGS

FIG. 1 is a top perspective view of the invention showing the air inlet in its open position;

FIG. 2 is a bottom perspective view of the invention showing its attachment to the roof of a motor vehicle;

FIG. 3 is a cross-sectional view along line 3—3 of FIG. 1;

FIG. 4 is a top plan view of the invention showing the air inlet in its closed position; and FIG. 5 is a cross-sectional view along line 5—5 of FIG. 1.

DETAILED DESCRIPTION OF THE INVENTION

A combination air scoop and air vent or scoop/vent 10 constructed in accordance with the present invention is shown mounted on a motor vehicle roof 12. The scoop/vent 10 has a low profile, aerodynamically shaped body or shell 14 which is made of a lightweight, rigid, corrosion-resistant material such as ABS plastic. The body or shell 14 has a flat, square or rectangular top portion 16 having a leading edge 18. Sloping downwardly and forwardly from the leading edge 18, and integral with the top portion 16 is a trapezodial front panel 20 having a rounded leading edge 22 which is somewhat shorter than the leading edge 18 of the top portion 16. Extending downwardly from the rounded leading edge 22 is a short vertical lip 24 which forms the leading surface of the shell 14.

Extending downwardly and flared slightly outwardly from the lateral edges of the top portion 16 and integral therewith are a pair of side portions 26 each having a leading edge 28 which is contiguous with the leading edge 18 of the top portion 16. Extending downwardly from the lateral edges of the front panel 20 and integral therewith is a pair of frontal side portions 30 which extend forwardly from the leading edges 28 of the side portions 26 to the lateral edges of the vertical leading lip 24. The frontal side portions 30 are integral with the side portions 26 and with the leading lip 24 and are angled inwardly from the leading edges 28 of the side portions 26 to their respective junctures with the lateral edges of the leading lip 24.

The top portion 16, the side portions 26, the front panel 20, the leading lip 24 and the frontal side portions 30 thus form the integral shell or body 14. Moreover, the front panel 20, the leading lip 24 and the frontal side portions 30 form an integral, drag-reducing, aerodynamic portion for the shell 14 inasmuch as the frontal surface area of the shell is minimized by the above-described configuration.

The top portion 16 has a trailing edge 32 which is contiguous with trailing edges 34 of each of the side portions 26. Joined to the shell 14 at the trailing edges 32 and 34 is a spoiler 36 having an upwardly and rearwardly extending top panel 38 contiguous with the trailing edge 32 and outwardly and rearwardly extending lateral panels 40 contiguous with the trailing edges 34. The spoiler 36 deflects the oncoming air away from the rear of the shell 14, thus creating a partial vacuum at the rear of the shell for the purposes to be presently described.

The bottom of the shell 14 is secured to a base 42 as by chemical welding. The perimeter of the base 42 is shaped so as to conform with the shape of the interior perimeter of the shell. The base 42 has a short upwardly extending vertical front lip 44 which is attached to the bottom portion of the leading lip 24 of the shell 14. Short upwardly extending side lips 46 and 48 are attached to the lower portions of the side panels 26 and frontal side panels 30 respectively. The rear of the base 42 turns upwardly into a short vertical rear lip 50.

As previously mentioned, the base 42 is welded to the interior perimeter of the shell 14. A substantial area of the bottom of the base 42 is cut away to form an opening 52 so that the interior of the shell 14 may communicate with the interior of the vehicle through a hole in the vehicle roof, as most clearly shown in FIG. 2. Many campers and vans come equipped with factory installed vents or scoops, and the industry standard for the holes in the roof to accommodate such vents and scoops is a 14 inch by 14 inch square hole. Thus, the opening 52 in the bottom of the base 42 would be most conveniently made with these dimensions so as to facilitate the installation of the present invention on a van or camper without altering the hole in the roof. A sponge-rubber seal 54 is glued to the base 42 around the perimeter of the opening 52, and the base 42 is secured to the roof 12 of the motor vehicle by means of "c"-shaped friction clamps 56 which engage the base 42 around the perimeter of the opening 52 and the roof 12 around the perimeter of the roof hole.

The sloping frontal panel 20 is provided with a rectangular air inlet opening or scoop opening 58. The intake of air through the inlet opening 58 is regulated by an air inlet valving panel 60 which is rotatingly mounted on a hinge 62 attached to the underside of the sloping frontal panel 20 forward of the inlet opening 58. Rotatably mounted on the valving panel 60 proximate the edge opposite the hinge 62 is one end of a "c"-shaped linkage rod 64, the other end of which is rotatably attached to one end of a linkage arm 66. The other end of the linkage arm 66 passes through a slot (not shown) in the bottom of a longitudinal rigid channel member 68 attached between the front and the rear of the base 42. This end of the arm 66 is then engaged by a conventional cranking mechanism 70 which is attached to the bottom of the channel member 68. A front hand crank 72 actuates the cranking mechanism 70.

Thus, by actuating the crank 72, the air inlet valving panel 60 may be moved between a closed position which is flush with the front panel 20 (as shown in FIG. 4 and in dotted outline in FIG. 3) and an open position in which the panel 60 extends into the interior of the shell 14, as shown in FIGS. 1, 2 and 3. As can be seen from the drawings, the air inlet 58 can be fully opened without presenting any obstruction to the smooth flow of air around the exterior of the shell 14, and without moving any part of the shell 14 or the base 42, thereby allowing these latter components to be maintained in their sturdy, flush-mounted fitting against the roof.

To achieve a better sealing fit between the inlet valving panel 60 and the front panel 20, a rubber perimeter seal 74 may be conveniently provided around the perimeter of the inlet opening 58. The inlet valving panel 60 is then conveniently provided with a depressed perimeter flange 76 to accommodate the perimeter seal 74.

The rear of the shell 14 between the top edge of the rear vertical lip 50 and the interior surface of the top portion 16 is open to provide an air outlet or air vent opening 78. The outlet opening 78 is closable by means of a movable air outlet valving panel 80, which is rotatingly attached to the interior of the rear vertical lip 50 by means of a hinge 82. The upper end of a "c"-shaped linkage rod 84 is rotatingly attached to the air outlet valving panel 80 proximate the upper edge thereof, while the lower end of the linkage rod 84 is rotatably attached to the upper end of a rear linkage arm 86. The rear linkage arm 86 bends downwardly and backwardly into the channel member 68 and passes through a slot (not shown) in the bottom thereof where it is engaged by a rear cranking mechanism 88, which is attached to the bottom of the channel member 68. A rear hand crank 90 actuates the rear cranking mechanism 88.

With the above-described arrangement, the air outlet valving panel 80 can be moved by turning the hand crank 90 between a closed position which is flush against the rear of the shell 14 (as shown in dotted outline in FIG. 3) and an open position in which it extends into the interior of the shell 14. Like the air inlet opening 58, the air outlet or vent opening 78 can be opened to allow venting of the vehicle without presenting any structure which would obstruct the smooth flow of air around the exterior of the shell 14 and without moving any part of the shell 14 or the base 42 with respect to the vehicle roof 12, and thus the flush mounting of the scoop/vent 10 on the roof 12 will not be disturbed by opening or closing the air outlet opening 78. Also, as with the air inlet opening 58, an air outlet opening seal 92 is provided around the perimeter of the air outlet opening 78 to provide a tight sealing closure when the air outlet valving panel 80 is in its closed position.

Having fully described the structure of the invention, its manner of operation will now be easily understood. When it is desired to have the scoop/vent 10 function only as an air scoop to introduce fresh air into the vehicle, the air inlet opening 58 is opened by turning the front hand crank 72 so as to move the air inlet valving panel 60 into its open position, while the rear hand crank 90 is turned so as to move the air outlet valving panel 80 into its closed position. When a direct air venting function is desired, the air inlet valving panel 60 is moved into its closed position and the air outlet panel 80 is moved into its open position. The spoiler 36 will enhance the venting action of the device by directing on-rushing air away from the vent opening 78, thereby creating a partial vacuum at the rear of the device which will boost the exhausting of air from the interior of the vehicle through the vent opening 78. If both the air inlet valving panel 60 and the air outlet valving panel 80 are moved into their perspective open positions, air will flow directly through the device from the air inlet opening 58 through the air outlet opening 78, creating a relatively low pressure area in the interior of the shell 14, which will result in the venting of air from the interior of the vehicle by means of a venturi type action. Since some air will be introduced into the vehicle through the air inlet opening 58 during this latter mode of operation, circulation of air through the vehicle can be achieved without the necessity of opening any windows in the vehicle. Again, the spoiler 36 will contribute to the operation of the device as in the direct venting mode.

As will be readily apparent, the spoiler 36 not only functions so as to enhance the venting action of the device, but also serves as a shield to prevent precipitation from entering the vehicle when the vent opening 78 is opened.

What is claimed is:

1. A ventilation device for a motor vehicle roof, comprising:
    a body having a top portion and front, rear, and side portions integral with said top portion, said body having an interior for communicating with the interior of said vehicle through a hole in said roof;
    a base attached to said body and attachable to said roof around the perimeter of said hole;
    an air inlet in said front portion of said body;
    air inlet valving means for opening and closing said air inlet and opening into the interior of said body;
    first means in the interior of said body for actuating said air inlet valving means;
    an air outlet in said rear portion of said body;
    air outlet valving means for opening and closing said air outlet, and opening into the interior of said body;
    second means in the interior of said body for actuating said air outlet valving means; and
    drag-reducing means in said front portion of said body, said drag-reducing means comprising:
        a short vertical leading section; and
        a sloping section extending downwardly and forwardly from said top portion of said body to said vertical leading section.

2. The ventilation device of claim 1, wherein said air inlet valving means comprises a first movable panel in said front portion, said panel having a closed position flush with said front portion.

3. The ventilation device of claim 1, wherein said air outlet valving means comprises a second movable panel in said rear portion, said second panel having a closed position flush with said rear portion.

4. The ventilation device of claim 1, wherein said top and side portions are fixed in position with respect to said roof.

5. The ventilation device of claim 1, further comprising air deflection means on said body for creating a partial vacuum at the exterior of said rear portion of said body when said vehicle is moving in a forward direction.

6. The ventilation device of claim 1, wherein said sloping section contains said air inlet and said air inlet valving means, said air inlet valving means having a closed position flush against said sloping section.

7. A ventilation device for a motor vehicle roof, comprising:
    a body having a top portion and front, rear, and side portions integral with said top portion, said body having an interior for communicating with the interior of said vehicle through a hole in said roof, said body being attachable to said roof around the perimeter of said hole;
    an air inlet in said front portion of said body;
    an air outlet in said rear portion of said body;
    an air inlet valving panel at said air inlet and movable between an open position and a closed position, said air inlet valving panel in said open position extending into the interior of said body and in said closed position resting flush against said front portion of said body;
    an air outlet valving panel at said air outlet and movable between an open position and a closed position, said air outlet valving panel in said open position extending into the interior of said body and in said closed position resting flush against said rear portion of said body;
    first means for moving said air inlet valving panel between said open and closed positions;
    second means for moving said air outlet valving panel between said open and closed positions; and
    drag-reducing means in said front portion of said body, said drag-reducing means comprising:
        a short vertical leading section; and
        a sloping section extending downwardly and forwardly from said top portion of said body to said leading section.

8. The ventilation device of claim 7, further comprising:
    air-deflection means on said body for creating a partial vacuum at the exterior of said air outlet when said vehicle is moving in a forward direction.

9. The ventilation device of claim 7, wherein said sloping section contains said air inlet.

10. A ventilation device for a motor vehicle roof, comprising:
    a body having a fixed top portion and front, rear, and side portions integral with said top portion, said front, rear, side and top portions defining the interior of said body, said body being attachable to said roof, said front portion including air-drag reducing means, comprising:
        a short vertical leading section; and
        a sloping section extending from said top portion to the top of said leading section; an air inlet in said sloping section;
    an air inlet valving panel in said air inlet and movable between an open position and a closed position, said air inlet valving panel extending into the interior of said body when in said open position and resting flush against said sloping section when in said closed position;
    first means in the interior of said body for moving said air inlet valving panel between said open position and said closed position while maintaining said top portion in a fixed spatial relationship with respect to said roof;

an air outlet in said rear portion of said body;

an air outlet valving panel in said air outlet and movable between an open position and a closed position, said air outlet valving panel extending into the interior of said body when in said open position and resting flush against said rear portion of said body when in said closed position; and second means in the interior of said body for moving said air outlet valving panel between said open and closed positions while maintaining said top portion of said body in a fixed spatial relationship with said roof.

11. The ventilation device of claim 10, further comprising air deflection means on said body for creating a partial vacuum at said air outlet when said vehicle is moving in a forward direction.

12. The ventilation device of claim 11, wherein said air deflection means comprises a panel connected along the trailing edge of said top portion and said rear portion and extending upwardly and rearwardly from said trailing edge.

* * * * *